(No Model.)

M. L. ABRAHAM.
BED PAN.

No. 421,467.   Patented Feb. 18, 1890.

Witnesses
W. Rossiter
Hugh Davies

Inventor
Martha L. Abraham
By A. Humphrey.
Atty.

UNITED STATES PATENT OFFICE.

MARTHA L. ABRAHAM, OF CHICAGO, ILLINOIS.

BED-PAN.

SPECIFICATION forming part of Letters Patent No. 421,467, dated February 18, 1890.

Application filed January 9, 1889. Serial No. 295,879. (No model.)

*To all whom it may concern:*

Be it known that I, MARTHA L. ABRAHAM, of Chicago, in the county of Cook and State of Illinois, have invented certain new and useful Improvements in Bed-Pans; and I hereby declare the following to be a correct and true description of the invention, such as will enable a person skilled in the art to which it belongs to make and use the same, reference being had to the accompanying drawings, and the letters of reference marked thereon.

The object of my invention is to construct a bed-pan with the pan or bowl part thereof detachable from the inclined front extension, so that said pan or bowl when detached may be used as a douche-pan, and so that the pan or bowl may be used as a urinal, douche-pan, bed-pan, or pus-pan, without raising or lifting the patient upon the same, and so that the pan or bowl may be easily emptied, cleansed, and handled, and so that the whole bed-pan or the pan or bowl alone may be readily and quickly warmed by simply pouring a small quantity of hot water into the pan or bowl or by holding the pan or bowl over a gas-jet, lamp, or other heat.

Figure 1:
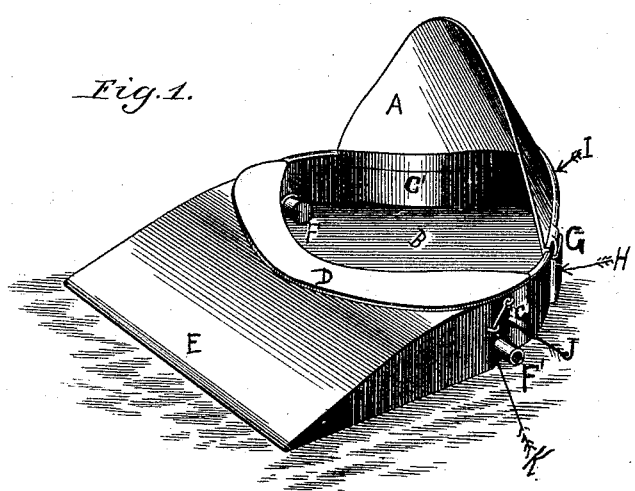
Figure 2:
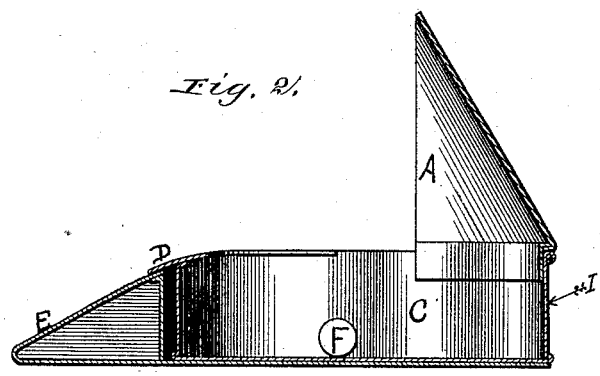
Figure 3:
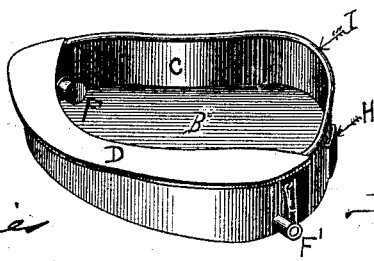

In the accompanying drawings, Figure 1 represents my invention with the pan or bowl, the front extension, and the rear shield or splasher together, ready for use as a bed-pan. Fig. 2 represents a section of my invention cut in two longitudinally at the center. Fig. 3 represents the pan or bowl detached from other parts and ready for use as a urinal, douche-pan, or pus-pan.

A is the detachable shield, designed to prevent the liquid contents of the pan or bowl or any liquid from splashing or slopping over upon the bed-clothing while the bed-pan is in use.

B is the bowl or pan, and C C' the walls of the same.

D is the flange or projection which extends down over the upper edge of the inclined front extension, so as to form a perfectly-smooth conjunction between the said front extension and the bowl or pan.

E is the inclined front extension.

F F' are the openings with short external tubes on which elastic tubes or pipes may be placed for the purpose of carrying off the liquid contents of the pan or bowl.

The shield A is made curved to fit on the wall of the pan or bowl B, and has projecting downward on the inner side of the pan or bowl a flange an inch or more in width, so that any liquid splashing against the shield will naturally run down into the pan or bowl, the flange protecting the joint between the shield A and the wall of the pan or bowl, and also assisting in holding said shield A in its place.

On the outside of the shield A, at or near each of its corners, is provided a tongue, as shown at G, Fig. 1, which slips into the keeper or loop H, as shown at H in Fig. 1, thus holding the shield A firmly in its place and enabling it to be quickly and easily attached and detached. The shield A is made preferably tapering toward the top thereof, so that at the top it is of only about one-half the width of the bottom thereof, and may be any height, preferably about six inches.

The pan or bowl B is constructed with a perfectly-flat bottom, and the walls thereof C C' are of the same height on all sides. Around the top of the walls C C' the material used is made thicker; or if sheet metal be used a wire extends around the upper edge of that part of the walls C C' not covered by the flange or protection D, the same as in ordinary tinware, to give strength to said walls and to make a smooth and nice appearing edge. The flange or protection D is made of some thin material—sheet metal is preferable—cut the shape of that wall of the pan or bowl B next to the front extension E, and is made of sufficient width to project or lap over the inclined top of the front extension E, and extends back over that part of the pan or bowl B between the tubes F F' some inch or more, thus preventing any liquid or other substance from getting into the joint between the pan or bowl B and the front extension E, and covers up said joint, so that when the pan or bowl is used combined with the front extension the top or seat is smooth and will not irritate the person. This flange or protection D is soldered or otherwise secured to the pan or bowl, so that the joint between them is water-tight. That part of the pan or bowl fitting against the front projection E is made curved, so that the center of said part, fitting against said front extension E, extends forward some two and one-half inches farther than the points at which the tubes F F′ are inserted. The side walls C C′ of said pan or bowl B gradually curve toward the end I of said pan or bowl, as shown in Fig. 3. These sides C C′, at about halfway between the tubes F F′ and the said end I, are bent inward slightly, forming in each of said sides a double curve, which enables said pan or bowl, when used without the front extension E, to be more easily and perfectly fitted against the person.

The tubes F F′ may be made of any convenient size and length, preferably about one-half to three-fourths of an inch in diameter and one and three-fourths of an inch in length. They should be made perfectly smooth with the wall on the inner side of the pan or bowl B, and externally should be smooth, so as to be readily cleaned and so as not to irritate the person when used. They should be made slightly tapering toward the outer point, so that they may be easily inserted into a flexible tube. These tubes F F′ are inserted through the walls of the pan or bowl at a point near or at the point where the side walls C C′ begin to curve to form the wall of said pan or bowl next to the front extension E, so that the rear ends of the sides of the inclined front extension E rest against said tubes F F′, as shown at K in Fig. 1, and said tubes thus assist in keeping said pan or bowl and said inclined front extension properly together and preventing said pan or bowl from slipping from side to side. When said pan or bowl is used without flexible tubes or other conveyer attached to said tubes F F′, there should be inserted, from the inner side of said pan or bowl B, a cork into each of said tubes, as shown at F, on the inner side of said pan or bowl B in Figs. 1 and 3. Said pan or bowl and said inclined front extension E are provided with hooks and eyes or other suitable fastening on each side thereof, just above and near said tubes F F′, for the purpose of holding said pan or bowl B and said inclined front extension together, one of which hooks and eyes is shown at J in Fig. 1.

When my device is used as a bed-pan, it is preferable to use it all together, as shown in Fig. 1, the front inclined extension E being placed under the patient, so that the weight rests on said front extension E and on the flange or projection D.

By removing the shield A my device may be used as a douche-pan or in giving injections; but it is usually preferable to remove both the shield A and the inclined front extension E and use the pan or bowl B alone for a douche-pan or urinal.

When using the pan or bowl B as a douche-pan or urinal—and it may be conveniently and advantageously used as a bed-pan in this shape—the pan or bowl is reversed, so that the end I is placed against the person, the bottom of said pan resting on the bedclothing. In this position by a slight pressure the pan or bowl B is held against the person, the curved sides or walls and end of said pan or bowl fitting the person in such manner as to prevent the escape of any liquid used.

The pan or bowl B may be used as a pus-pan or a dressing-pan in surgical operations, the rounded end I and the double curves in the walls C C′ forming curves and rounded parts, which may be fitted closely to almost any part of the person.

The front extension E is constructed with a perfectly-flat bottom extending from the front point of said front extension E clear back under the rear end I of the pan or bowl B, said bottom being made the shape of the front extension E back to the rear ends of the sides of said front extension, and from the rear ends of the sides of said front extension E to the rear end of the pan or bowl B the bottom of said front extension E is simply a thin piece of material made exactly the shape of the bottom of the pan or bowl B, so that when the front extension E and the pan or bowl B are used together the pan or bowl B rests on the rear-extending bottom of the front extension E. This mode of construction makes the bottom of the bed-pan, when the three parts are used together, perfectly smooth, so that it will not catch or tear the bedclothing, and it also makes the two parts, the pan or bowl B and the front extension E, fit more perfectly and firmly together.

The walls or sides of the front extension E, at their ends next to the pan or bowl B, are made the same height as the walls C C′ of the pan or bowl B and gradually slant off to the front edge of said front extension E, where the bottom and top of said front extension join in an edge.

The front extension E should be made perfectly tight, so that no substance can get into the space between the bottom and the inclined top thereof, the main part of said front extension E being a tight box having a curved rear side and an inclined top coming to an edge at the front by being joined with the bottom thereof, and is designed for a rest or seat while the pan is in use.

It is preferable to make the front extension E as wide as the widest part of the pan or bowl B and about six inches in length at the center thereof, where it is the shortest.

The rear part of the inclined top of the front extension E is curved to fit the curved wall of the pan or bowl B which comes next to said front extension, and from the top to the bottom of said front extension and extending from one rear end to the other of the sides of said front extension is a wall which is curved the same shape of and made to fit against the adjoining wall of the bowl or pan B. This wall in the front extension E strengthens the inclined cover thereof at its rear end, making it of sufficient strength to sustain the weight of the patient, and, it being perfectly tight, prevents any substance getting into the space between the top and bottom of said front extension E.

My invention is constructed preferably of tin or other sheet metal; but it may be made of the materials usually used for constructing bed-pans. The pan or bowl is preferably made about eleven or twelve inches wide by ten or eleven inches long, and the front extension E and shield A in proportionate dimensions.

I am aware that flexible tubes have long been used for carrying off the liquid contents of bed-pans, and I therefore make no claim to this feature taken separately.

What I claim as my invention, and desire to secure Letters Patent for, is—

1. A bed-pan provided with a detachable front extension, which front extension is constructed perfectly tight, and the bottom of which extends under the entire bowl of said bed-pan, whereby no liquid is allowed to enter said front extension and whereby said front extension and the bowl of said bed-pan are easily attached or detached, substantially as and for the purposes herein specified.

2. A bed-pan consisting of the bowl or pan B, the detachable front extension E, and the detachable rear shield A, so constructed that the front extension E and the rear shield A may be quickly and easily detached, substantially as and for the purposes herein specified.

In witness whereof I have hereunto set my hand, in the presence of three witnesses, November 30, 1888.

MARTHA L. ABRAHAM.

Witnesses:
A. HUMPHREY,
J. M. EATON,
HUGH DAVIES.